United States Patent [19]

Juvinall et al.

[11] Patent Number: 5,291,271
[45] Date of Patent: Mar. 1, 1994

[54] MEASUREMENT OF TRANSPARENT CONTAINER WALL THICKNESS

[75] Inventors: John W. Juvinall, Ottawa Lake, Mich.; Steven D. Kistler, Toledo; James A. Ringlien, Maumee, both of Ohio

[73] Assignee: Owens-Brockway Glass Container Inc., Toledo, Ohio

[21] Appl. No.: 932,470

[22] Filed: Aug. 19, 1992

[51] Int. Cl.$^5$ ............................................. G01B 11/06
[52] U.S. Cl. ................................................... 356/382
[58] Field of Search ............... 356/181, 182, 239, 240; 250/560

[56] References Cited

U.S. PATENT DOCUMENTS

| 3,807,870 | 4/1974 | Kalman | 356/239 |
| 3,994,599 | 11/1976 | Southwell . | |
| 4,902,902 | 2/1990 | Tole | 356/382 |

FOREIGN PATENT DOCUMENTS

| 0320139A2 | 6/1989 | European Pat. Off. . | |
| 2481445 | 10/1981 | France . | |
| 216903 | 12/1983 | Japan | 356/382 |
| 1348639 | 10/1987 | U.S.S.R. | 356/382 |
| 2182436A | 5/1987 | United Kingdom . | |

OTHER PUBLICATIONS

Zeiss brochure "Light-section Microscope" undated.
Degenhard, "Light-Section Microscope Measures Thin Film-Thickness" undated.
Honeywell "Visitronic 100 Series" brochure undated.
Control Optics "Laser Thickness Gauges-General Specification", undated.

Primary Examiner—F. L. Evans

[57] ABSTRACT

Apparatus for measuring sidewall thickness of transparent containers that includes a source for directing a light beam onto the outer surface of the container sidewall at an angle such that a portion of the light beam is reflected from the outer sidewall surface, and a portion is refracted into the container sidewall, reflected from the inner sidewall surface and then re-emerges from the outer sidewall surface. A lens is disposed between a linear array light sensor and the container sidewall for focusing light energy reflected from the outer and inner sidewall surfaces onto the sensor. The lens has an image plane in which the sensor is disposed and an object plane co-linear with the light beam. Electronics is responsive to light energy incident on the sensor for determining wall thickness of the container between the inner and outer sidewall surfaces.

11 Claims, 3 Drawing Sheets

MEASUREMENT OF TRANSPARENT CONTAINER WALL THICKNESS

The present invention is directed to inspection of transparent containers for commercial variations or defects that affect optical properties of the container walls, and more particularly to an apparatus and method or electro-optically measuring thickness of container walls (sidewalls, shoulder, neck, head and/or bottom).

BACKGROUND AND OBJECTS OF THE INVENTION

In the manufacture of transparent containers of glass composition, for example, it is heretofore been proposed to measure sidewall thickness of the containers in order to detect thin areas that may affect ability of the containers to withstand pressurization and handling. In one container sidewall thickness gauge commercially employed by applicants' assignee, a radio frequency electrode is placed near the outer surface of the container wall, and the amplitude of the signal received at a coaxial pick-up electrode is related to container wall thickness. This technique is highly sensitive to distance between the pick-up electrode and the container wall surface, and the electrode is mounted on a wheel that rides on the container surface in order to control the electrode/surface separation. Mechanical contact with the container, and vibration at the probe when the container moves into position, cause a high failure rate at the electrode assembly.

European published application No. 0320139A2 discloses an electro-optical non-contact system for measuring sidewall thickness of transparent containers A laser beam is directed to intersect the container outer wall surface at an angle of 37.5° to the container radius. A portion of the light beam is reflected from the outer surface of the container, and a portion is refracted into the container wall and is incident on the inner surface of the container wall. A portion of the light incident on the inner wall surface is again reflected to the outer wall surface and refracted out of the container sidewall. A fresnel lens is disposed to direct light reflected from the inner and outer sidewall surfaces onto a linear array optical sensor, at which separation between the rays reflected from the inner and outer sidewall surface reflection points is proportional to sidewall thickness. The lens and sensor are positioned so that the outer surface reflection point and the virtual image of the inner surface reflection point are in the object plane of the lens, while the sensor array is in the image plane of the lens. That is to say that the linear array sensor is optically parallel to a line between the outer surface reflection point and the virtual image of the inner surface reflection point.

Although the technique disclosed in the noted European application reduces measurement sensitivity to deviations of the inner wall surface from parallelism with the outer wall surface, it is highly sensitive to container position. That is, the disclosed technique is highly sensitive to separation between the measurement optics and the container wall surface, which is difficult to control in high-speed conveyor and inspection systems for mass production of transparent containers. It is therefore a general object of the present invention to provide an electro-optical apparatus and method for non-contact measurement of sidewall thickness in transparent containers that are substantially independent of container position relative to the measurement optics. Another object of the present invention is to provide non-contact sidewall thickness measurement apparatus and method that achieve the foregoing objects while maintaining reduced sensitivity to non-parallelism between the inner and outer sidewall surfaces. A further object of the present invention is to provide a transparent container sidewall thickness measurement apparatus and method of the described character that provide an output that simulates the output of the current radio frequency measurement gauge described above, so that the measurement apparatus may be employed in current container inspection systems without substantial modification to the remainder of the system.

SUMMARY OF THE INVENTION

Apparatus for measuring sidewall thickness of transparent containers in accordance with the present invention includes a light source such as a laser for directing a light beam onto the outer surface of the container sidewall at an angle such that a portion of the light beam is reflected from the outer sidewall surface, and a portion is refracted into the container sidewall, reflected from the inner sidewall surface and then re-emerges from the outer sidewall surface. A light sensor preferably comprises a plurality of sensing elements disposed in a plane. A lens is disposed between the sensor and the container sidewall for focusing light energy reflected from the outer and inner sidewall surfaces onto the sensor. The lens has an image plane in which the sensor is disposed and an object plane co-linear with the incident light beam. Electronics is responsive to light energy incident on the sensor for determining wall thickness of the container between the inner and outer wall surfaces.

In the preferred embodiment of the invention, the lens has a limited aperture, preferably substantially equal to approximately 40° acceptance angle, for focusing light energy reflected from the inner container sidewall surface onto the sensor only when the inner surface is substantially parallel to the outer surface. The lens, sensor and detection electronics thus possess enhanced responsiveness to the thinnest and thickest sections of the container sidewall. The light sensor in the preferred embodiment of the invention comprises a plurality of sensing elements disposed in a linear array parallel to the light beam incident on the container sidewall. Sidewall thickness is proportional to separation at the array between the portions of the light beam reflected from the outer and inner surfaces. The light beams and the linear array sensor are disposed in a plane perpendicular to the container surface at the impact point of the beam, and the container is rotated about its central axis. Preferably, the linear array sensor is scanned at increments of container rotation, and scan data is averaged over a plurality of scanned increments controllable by software, thereby simulating the output from the conventional rf gauge, which measures sidewall thickness over a larger area.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
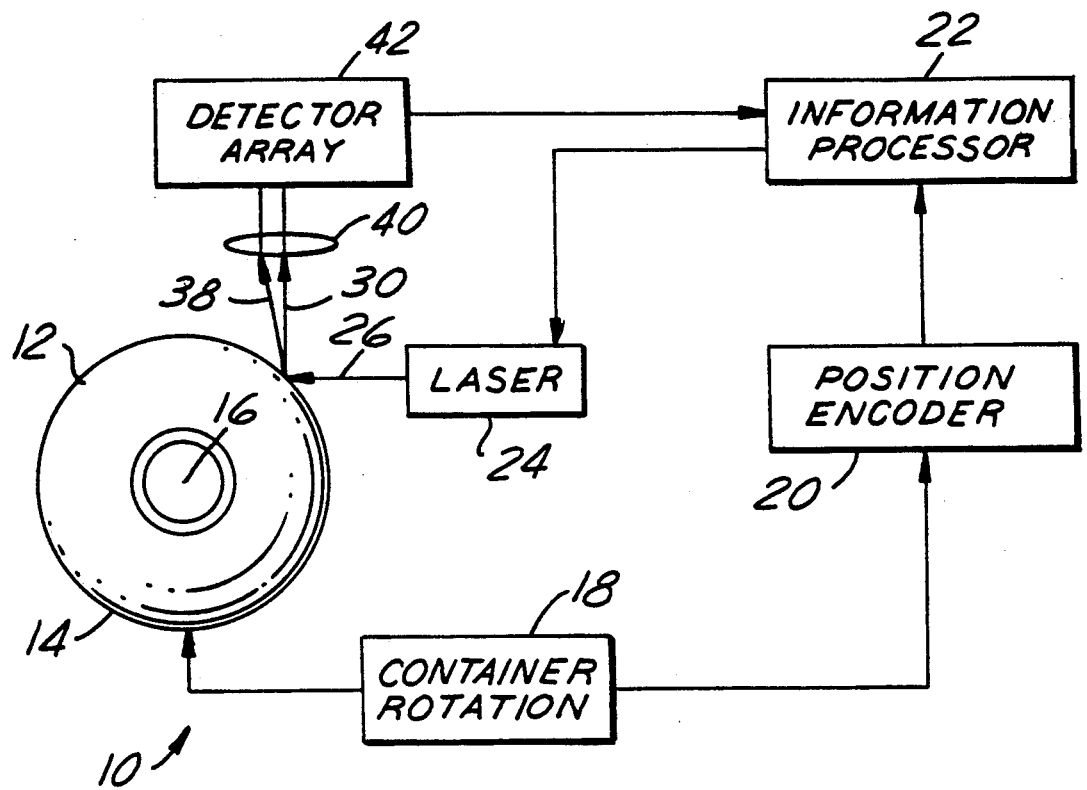
FIG. 1 is a schematic diagram of a container sidewall thickness measurement apparatus in accordance with a presently preferred embodiment of the invention.
Figure 2:
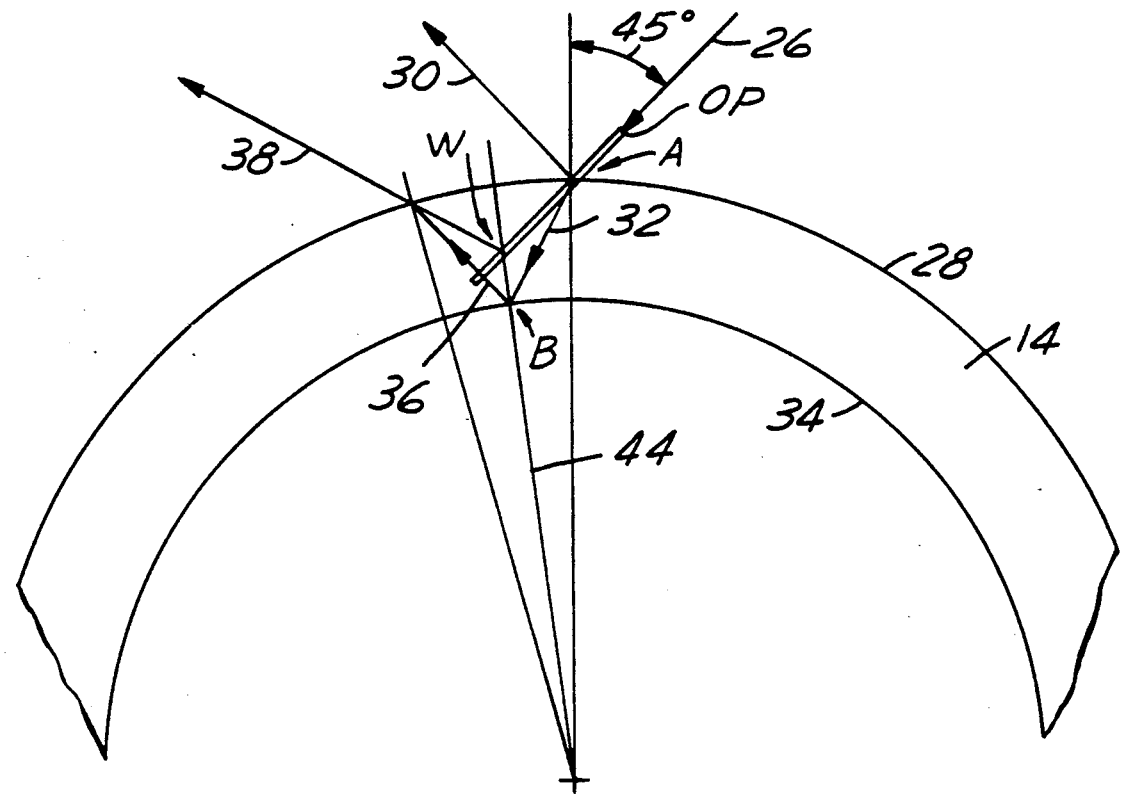
FIG. 2 is a ray trace schematic diagram that illustrates operation of the embodiment of the invention illustrated in FIG. 1.

FIG. 1 is a schematic diagram of an inspection station 10 for measuring sidewall thickness of transparent containers 12 having a substantially cylindrical sidewall 14 and a central axis 16. At station 10, container 12 is engaged by a drive wheel 18 or other suitable device for rotating the container about its central axis 16. Drive 18 is also connected to a position encoder 20 for providing a signal to an information processor 22 indicative of increments of container rotation. A laser or other suitable light source 24 is controlled by information processor 22 to direct a collimated beam 26 of coherent light energy onto sidewall 14 of container 12 at a nominal angle of 45° to the container radius. As shown in FIG. 2, light beam 26 is incident at point A on the outer surface 28 of container sidewall 14, at which a portion 30 is reflected from outer surface 28 and a portion 32 is refracted into the container sidewall. Light beam portion 32 is incident at point B on the inner surface 34 of sidewall 14, from which a portion 36 is reflected back into the container sidewall to intersect the outer surface 28. Ultimately, a portion 38 of the light energy reflected from inner sidewall surface 34 emerges from outer surface 28.

Returning to FIG. 1, a lens 40 is positioned to intercept beam portions 30,38 reflected from the outer and inner surface reflection points A,B of container sidewall 14, and to focus such beam portions 30,38 onto a light sensor 42. Lens 40 may be a fresnel, holographic, plastic or glass lens; a multi-element glass lens is currently preferred. Preferably, sensor 42 comprises a plurality of light sensing elements or cells disposed in a linear array. Linear detector array 42 is disposed in the image plane of lens 40, which has an object plane OP (FIG. 2) co-linear with the axis of incident beam 26. Preferably, the object plane OP of lens 40 is imaged onto detector 42 at substantially 1:1 ratio. Laser 24, lens 40 and sensor 42 are disposed so that light beams 26,30,38 and the linear array of sensor 42 are all in a plane perpendicular to the surface of container 12 at the point of impact of the incident beam 26. The preferred angle of incidence of beam 26 is 45°. The optical axis of lens 40 bisects the nominal axes of reflected beams 30,38. Such an orientation is less sensitive to container wobble and deviations.

Figure 3:
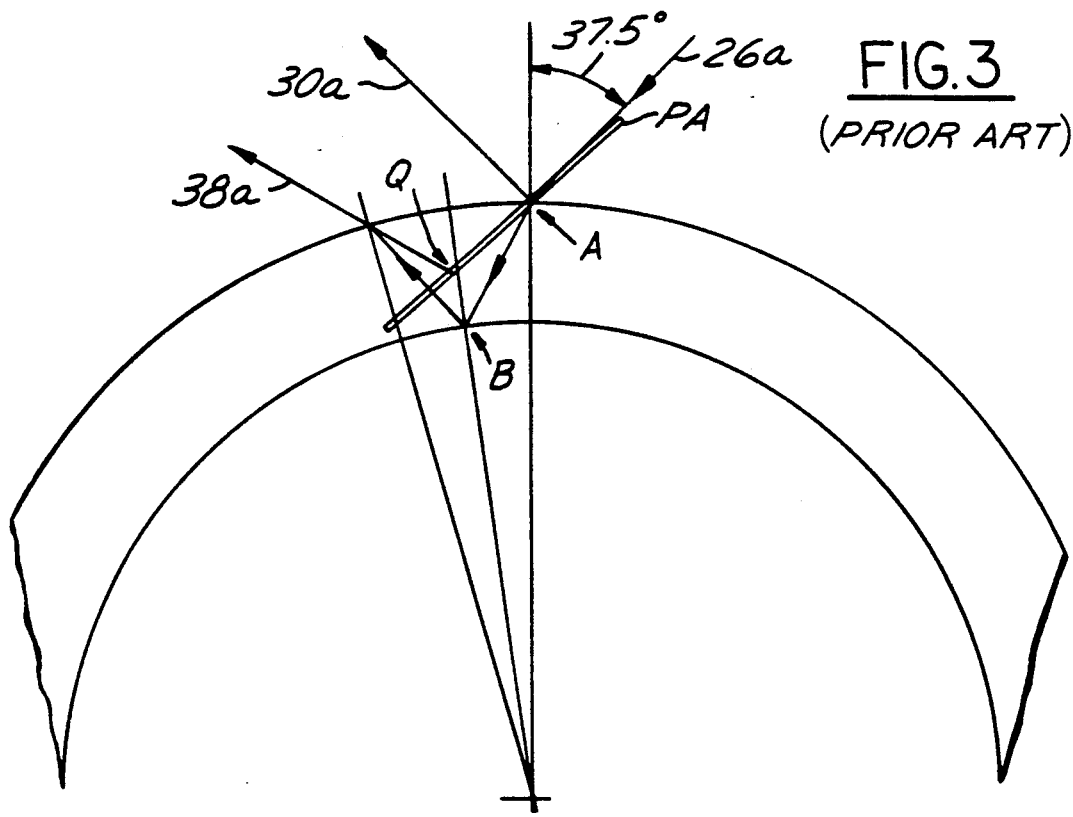
FIG. 3 is a ray trace schematic diagram similar to that of FIG. 2 but illustrating operation in accordance with the prior art.

For purposes of comparison, FIG. 3 illustrates the position of the linear detector object plane PA relative to the various incident and reflected beams in accordance with the prior art European application discussed above. Incoming beam 26a is incident at point A at an angle of 37.5°, which is stated in the prior art to provide best results. The object plane PA of the focusing lens is co-linear with a line between the outer surface reflection point A and the virtual image Q of the inner surface reflection point B. It can be shown mathematically that the virtual image Q of the inner surface reflection point B in FIG. 3, and the point W at which the object plane OP intersects the container radius 44 in FIG. 2, are non-identical.

Figure 4:
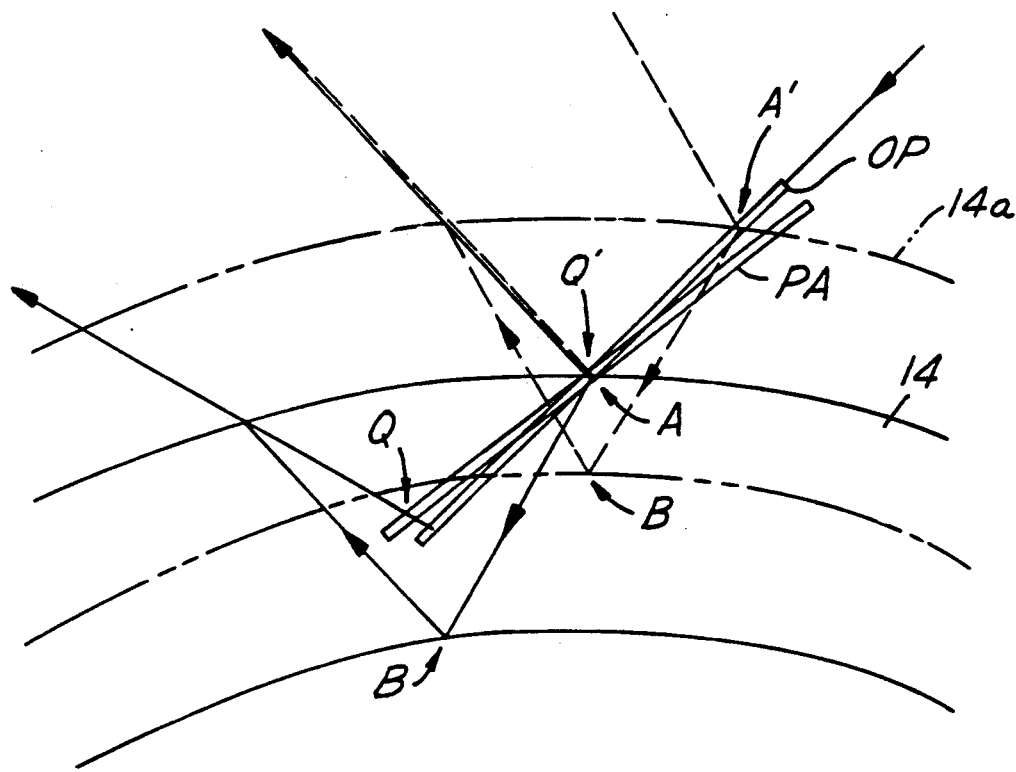
FIGS. 4 and 5 are fragmentary ray trace schematic diagrams similar to that of FIG. 2, but on an enlarged scale, illustrating advantages of the present invention over the prior art.

The present invention (FIGS. 1 and 2) provides enhanced ability over the prior art (FIG. 3) to measure sidewall thickness in containers that deviate from ideal or nominal geometry or position. FIG. 4 illustrates operation of the invention versus the prior art in a situation where the container sidewall 14 is displaced to the position 14a toward the detection optics. At the nominal position of container sidewall 14, the outer surface reflection point A and the virtual image Q of the inner surface reflection point B are located on the object plane PA of the imaging lens in the prior art. However, when the container is displaced to the sidewall position 14a, the incoming beam is now incident at the point A' and the virtual image of the inner surface reflection point B' is displaced to the position Q'. Since the measurement device itself has not moved, the object plane PA of the lens remains at the same position, so that neither point A' nor Q' is in the object plane. There is thus an error at both reflection points because neither point A' or Q' is in the object plane. However, with the object plane OP positioned in accordance with the present invention, the outer surface reflection points A and A' are both disposed in the detector object plane, and the sole source of error is in the change of position of the inner surface reflection point. In the situation illustrated schematically in FIG. 4, the present invention obtains an approximately 65% reduction in measurement error.

Figure 5:
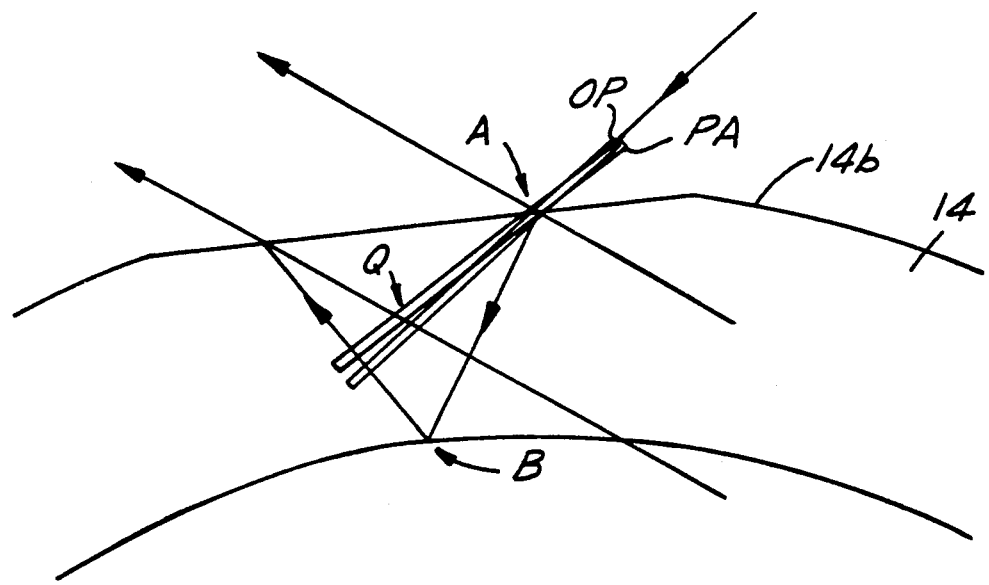

FIG. 5 illustrates a container in which the sidewall 14 has a flat spot 14b in the outer sidewall surface. In this situation, it will be noted that neither the outer surface reflection point A nor the virtual image Q of the inner surface reflection point B lie in the detector object plane PA, once again creating two sources of measurement error. However, the outer surface reflection point A remains in the object plane OP in accordance with the present invention.

In sum, the prior art technique disclosed in the above-noted European application contains two sources of error relating to displacement of the outer surface reflection point and the virtual image of the inner surface reflection point from the object plane in various situations. However, in identical situations, the technique of the present invention contains only a single source of error, which has been found to be sufficiently small in practice to yield accurate readings not only on ideal containers, but on production containers within normal tolerances as well. The technique of the present invention thus provides a more accurate measurement of container sidewall thickness despite normal production deviations from ideal container position and sidewall contour.

Returning to FIGS. 1 and 2, lens 40 is positioned so that detector array 42 lies within the image plane of the lens, and the object plane OP of the lens is co-linear with beam 26 as previously described. Preferably, lens 40 (which may comprise a lens system) is of limited aperture so that the lens only accepts beam portions 38 reflected from the inner sidewall surface when the inner sidewall surface 34 is parallel or substantially parallel to the outer sidewall surface 28. This occurs at all local minimum and maximum thickness points, thereby creating a thin/thick spot detector in combination with the sensor electronics 22. In the preferred embodiment of the invention, the effective aperture of lens 40 is f1.4, or approximately 40° acceptance angle. With such an acceptance angle, the lens will capture light from a surface that can be tilted about −10° from nominal. That is, both surfaces can tilt −10° independently in vertical and/or horizontal directions. If the angle is greater than 10° in the plane of rotation, the system is non-responsive to the minimum and maximum thicknesses.

Figure 6:
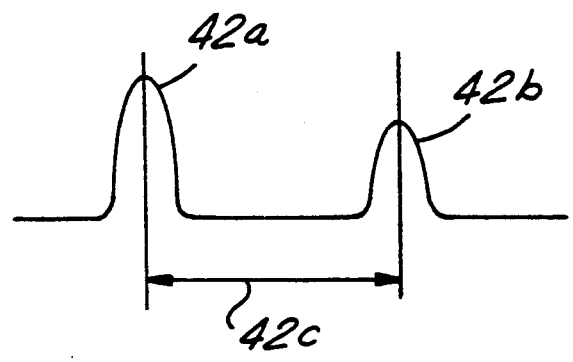
FIG. 6 is a schematic diagram that illustrates detector output in accordance with the invention.

Detector array 42 is scanned by information processor 22 at increments of container rotation. FIG. 6 illustrates the output of detector array 42, providing a first peak 42a associated with reflected beam 30 from the outer surface and a second peak 42b associated with reflected beam 38 from the inner surface. Information process identifies the weighted centerline of each peak 42a,42b, and computes thickness 42c therefrom. Preferably, a variable width electronic filter in the information processor allows averaging of the thickness measurement in the horizontal direction over a selectable number of increments, which can be used to simulate a larger measurement area as in the prior art rf gauge described above.

The system of the invention may be employed in conjunction with any transparent material, and may measure sidewall, shoulder, neck, head or bottom thickness. Light source 24, lens 40 and array 42 may be mounted on a head that is movable with respect to the container. In this connection, it will be recognized that prior art techniques have encountered difficulty measuring wall thickness at radiused locations, such as shoulders and heels.

We claim:

1. Apparatus for measuring wall thickness of transparent containers that comprises:
    means for directing a light beam onto the outer surface of a container wall at an angle such that a portion of the light is reflected from the outer surface, and a portion is refracted into the container wall and reflected from the inner wall surface,
    light sensing means disposed in a plane,
    means for focusing light energy reflected from said outer and inner wall surfaces onto said light sensing means, said focusing means having an image plane in which said light sensing means is disposed and an object plane co-linear with said light beam directed onto the outer surface of the container, and
    means responsive to light energy incident on said sensing means for determining wall thickness of the container between the inner and outer wall surfaces.

2. The apparatus set forth in claim 1 wherein said focusing means comprises having an acceptance angle of approximately 40°.

3. The apparatus set forth in claim 1 wherein said sensing means comprises a plurality of light sensors disposed in a linear array, wall thickness of the container being proportional to separation at said array between light energy reflected from said outer and inner wall surfaces.

4. The apparatus set forth in claim 3 wherein said light beam and said linear array are disposed in a plane perpendicular to the container outer surface.

5. The apparatus set forth in claim 4 wherein said means for determining wall thickness of the container comprises means for scanning said array at increments of container rotation, and means for averaging scan data over a plurality of said increments.

6. The apparatus set forth in claim 5 wherein said angle is substantially equal to 45°.

7. The apparatus set forth in claim 1 wherein said beam-directing means comprises a laser.

8. A method of measuring sidewall thickness of a transparent container having a substantially cylindrical sidewall and a central axis comprising the steps of:
    (a) directing a light beam onto the sidewall of a container at an angle such that a portion of the light beam is reflected from the outer surface of the container sidewall, and a portion is refracted into the container sidewall and reflected from the inner sidewall surface,
    (b) directing the light reflected from the outer and inner sidewall surfaces onto a light sensor with a lens that has an image plane in which the sensor is disposed and an object plane co-linear with the light beam directed onto the container sidewall in said step (a), and
    (c) measuring wall thickness as a function of separation at said sensor between said light reflected from said outer and inner sidewall surfaces.

9. The method set forth in claim 8 wherein said lens has an acceptance angle of substantially 40°.

10. The method set forth in claim 8 comprising the additional step of: (d) rotating the container about its central axis.

11. The method set forth in claim 10 wherein said step (c) comprises the steps of: (c1) scanning said sensor at increments of container rotation, (c2) determining a wall thickness measurement at each said increment, and (c3) averaging thickness measurements determined in said step (c2) over a plurality of rotation increments.

* * * * *